US010630701B2

(12) United States Patent
Lin et al.

(10) Patent No.: US 10,630,701 B2
(45) Date of Patent: Apr. 21, 2020

(54) SYSTEM AND METHOD FOR IDENTIFYING APPLICATION LAYER BEHAVIOR

(71) Applicant: Institute For Information Industry, Taipei (TW)

(72) Inventors: Chih-Ta Lin, Taipei (TW); Sung-Lin Wu, New Taipei (TW); Mei-Ling Lee, Taipei (TW)

(73) Assignee: Institute For Information Industry, Taipei (TW)

( * ) Notice: Subject to any disclaimer, the term of this patent is extended or adjusted under 35 U.S.C. 154(b) by 259 days.

(21) Appl. No.: 15/835,377

(22) Filed: Dec. 7, 2017

(65) Prior Publication Data

US 2019/0166138 A1 May 30, 2019

(30) Foreign Application Priority Data

Nov. 29, 2017 (TW) .............................. 106141608 A (51) Int. Cl.
*H04L 29/00* (2006.01)
*H04L 29/06* (2006.01)
*G05B 23/02* (2006.01)
*G05B 19/042* (2006.01)

(52) U.S. Cl.
CPC ...... *H04L 63/1416* (2013.01); *G05B 19/0425* (2013.01); *G05B 23/024* (2013.01)

(58) Field of Classification Search
CPC .............. G05B 23/024; G05B 19/0425; G05B 23/0254; H04L 63/1416; H04L 63/1425; H04L 63/1441; H04L 67/12
See application file for complete search history.

(56) References Cited

U.S. PATENT DOCUMENTS

| 8,752,173 | B2 * | 6/2014 | Yadav ................ H04L 63/1408 726/23 |
| 8,789,180 | B1 | 7/2014 | Yang et al. |
| 9,654,503 | B1 * | 5/2017 | Kowalyshyn ....... H04L 63/1466 |
| 9,660,994 | B2 | 5/2017 | McQuillan et al. |

(Continued)

FOREIGN PATENT DOCUMENTS

| TW | 201304455 A | 1/2013 |
| TW | 201712586 A | 4/2017 |

(Continued)

OTHER PUBLICATIONS

Office Action to the corresponding Taiwan Patent Application rendered by the Taiwan Intellectual Property Office (TIPO) dated Jun. 29, 2018, 9 pages (including English translation).

(Continued)

*Primary Examiner* — Don G Zhao
(74) *Attorney, Agent, or Firm* — Skaar Ulbrich Macari, P.A.

(57) ABSTRACT

A system and method for identifying application layer behavior are disclosed. In order to detect intrusion into an industrial control system, the system and method determine a current status of application layer behavior of the industrial control system by analyzing a current packet which is propagated between a master device and a slave device in the industrial control system, and identify whether the current status of the application layer behavior is normal according to a normal behavior status list.

12 Claims, 4 Drawing Sheets

(56) References Cited

U.S. PATENT DOCUMENTS

| | | | |
|---|---|---|---|
| 10,015,069 B1* | 7/2018 | Blank | H04L 41/5038 |
| 10,242,193 B1* | 3/2019 | Babun | G06F 21/57 |
| 2007/0233857 A1* | 10/2007 | Cheng | G06Q 30/02 709/224 |
| 2010/0287613 A1* | 11/2010 | Singh | H04L 63/0254 726/22 |
| 2012/0158927 A1* | 6/2012 | Pao | H04L 43/0817 709/221 |
| 2012/0291116 A1 | 11/2012 | Malins | |
| 2013/0151849 A1* | 6/2013 | Graham | H04L 9/32 713/164 |
| 2013/0333029 A1* | 12/2013 | Chesla | H04L 45/74 726/22 |
| 2014/0143873 A1* | 5/2014 | Stirtzinger | H04L 63/1408 726/23 |
| 2015/0195299 A1* | 7/2015 | Zoldi | H04L 63/1433 726/25 |
| 2015/0301515 A1 | 10/2015 | Houmb | |
| 2016/0085237 A1 | 3/2016 | Yunoki et al. | |
| 2016/0099963 A1* | 4/2016 | Mahaffey | H04L 63/0227 726/25 |
| 2017/0054751 A1* | 2/2017 | Schneider | H04L 63/1425 |
| 2017/0091461 A1* | 3/2017 | Tin | G06F 21/564 |
| 2017/0093897 A1* | 3/2017 | Cochin | H04L 63/1416 |
| 2017/0126745 A1 | 5/2017 | Taylor | |
| 2018/0359244 A1* | 12/2018 | Cockerill | H04L 63/0853 |
| 2019/0052676 A1* | 2/2019 | Giokas | H04L 63/20 |
| 2019/0098036 A1* | 3/2019 | Kyle | H04L 63/0227 |
| 2019/0311134 A1* | 10/2019 | Mahaffey | H04L 63/166 |

FOREIGN PATENT DOCUMENTS

| | | |
|---|---|---|
| TW | M542807 U | 6/2017 |
| TW | 201738796 A | 11/2017 |

OTHER PUBLICATIONS

The extended European Search Report rendered by the European Patent Office for European Patent Application No. 17205801.8, dated Aug. 7, 2018, 8 pages.

"Linear discriminant analysis", Wikipedia, Oct. 23, 2017, 11 pages.

* cited by examiner

SYSTEM AND METHOD FOR IDENTIFYING APPLICATION LAYER BEHAVIOR

PRIORITY

This application claims priority to Taiwan Patent Application No. 106141608 filed on Nov. 29, 2017, which is hereby incorporated by reference in its entirety.

FIELD

Embodiments of the present invention relate to a system and a method for identifying application layer behavior. More particularly, the embodiments of the present invention relate to a system and a method for identifying application layer behavior in an industrial control system.

BACKGROUND

An industrial control system (ICS) generally may be divided into three layers, i.e., a field layer, a control layer and a supervisory control layer. The field layer may comprise various industrial equipments and sensors, and the sensors may sense operating conditions of the industrial equipments and transmit the sensed data to the control layer. The control layer may comprise a slave device, e.g., a programmable logic controller (PLC), which is configured to control the operation of the industrial equipments of the field layer and transmit data sensed by the sensors to the supervisory control layer via a gateway. The supervisory control layer may comprise a master device, e.g., a human machine interface (HMI) and/or a supervisory control and data acquisition (SCADA) system, for remotely supervising and controlling the operation of the whole industrial system.

For packet transmission between the supervisory control layer and the control layer in the industrial control system, most of current communication network protocols are regulated by mechanisms that need no authentication such as plain code transmission, broadcasting or the like, so the industrial control system is particularly vulnerable to attack or intrusion from third parties such as detection, response injection, command injection and paralyzing service or the like. Besides, the conventional industrial control system does not have a mechanism that is specially configured to detect or identify the attack or intrusion from the third party, so the damage to the conventional industrial control system caused by the attack or intrusion from the third party is more serious. Accordingly, an urgent need exists in the art to detect whether the industrial control system is subjected to the attack or intrusion of the third party.

SUMMARY

The disclosure includes a system for identifying application layer behavior. The system for identifying application layer behavior may comprise a storage, a transmitter and a processor electrically connected with the storage and the transmitter. The storage may be configured to store a normal behavior status list. The transmitter may be configured to transmit to the system for identifying application layer behavior a current packet which is propagated between a master device and a slave device in an industrial control system. The processor may be configured to determine a current status of the application layer behavior of the industrial control system by analyzing the current packet and identify whether the current status of the application layer behavior is normal according to the normal behavior status list.

The disclosure also includes a method for identifying application layer behavior. The method for identifying application layer behavior may comprise the following steps:

transmitting to a system for identifying application layer behavior a current packet which is propagated between a master device and a slave device in an industrial control system; and determining, by the system for identifying application layer behavior, a current status of the application layer behavior of the industrial control system by analyzing the current packet and identifying, by the system for identifying application layer behavior, whether the current status of the application layer behavior is normal according to a normal behavior status list.

In the industrial control system, the architecture of a communication network generally may comprise four layers, i.e., a network interface layer (corresponding to a physical layer and a data connection layer in an open system interconnection reference model (OSI)), an Internet layer (corresponding to a network layer in the OSI), a host-to-host transmission layer (corresponding to a transmission layer in the OSI), and an application layer (corresponding to a session layer, a presentation layer and an application layer in the OSI). When the industrial control system is subjected to the attack or intrusion from the third party, an abnormal behavior may occur in any one or more layers among the network interface layer, the Internet layer, the host-to-host transmission layer and the application layer. Therefore, in the embodiments of the present invention, whether the industrial control system is subjected to the attack or intrusion from the third party can be determined by the following operations: determining the status of the application layer behavior of the industrial control system by analyzing application layer data of a packet being propagated between the supervisory control layer (the master device) and the control layer (the slave device), and identifying whether the status of the application layer behavior is normal according to a preset normal behavior status list.

Whether the industrial control system is subjected to the attack or intrusion from the third party is determined based on the application layer behavior of the industrial control system. Therefore, even if the attack or intrusion (e.g., attack or intrusion with a legal host or equipment as a springboard) from the third party will not cause any abnormal behavior in the network interface layer, the Internet layer and the host-to-host transmission layer of the industrial control system, the attack or intrusion can still be detected.

According to the above descriptions, in the embodiments of the present invention, whether the industrial control system is subjected to the attack or intrusion from the third party can be detected effectively.

This summary is not intended to encompass all embodiments of the present invention but is provided only to overall describe the core concept of the present invention and cover the problem to be solved, the means to solve the problem and the effect of the present invention to provide a basic understanding of the present invention by a person having ordinary skill in the art. The present invention can be further understood by a person having ordinary skill in the art according to embodiments provided in the attached drawings and following implementations.

DETAILED DESCRIPTION

In the following description, the present invention will be explained with reference to certain example embodiments thereof. However, these example embodiments are not intended to limit the present invention to any specific examples, embodiments, operations, environment, applications, structures, processes or steps described in these example embodiments.

In the attached drawings, elements unrelated to the present invention are omitted from depiction; and dimensions of elements and proportional relationships among individual elements in the attached drawings are only exemplary examples but not intended to limit the present invention. Unless stated particularly, same (or similar) element symbols may correspond to same (or similar) elements in the following description.

Figure 1:
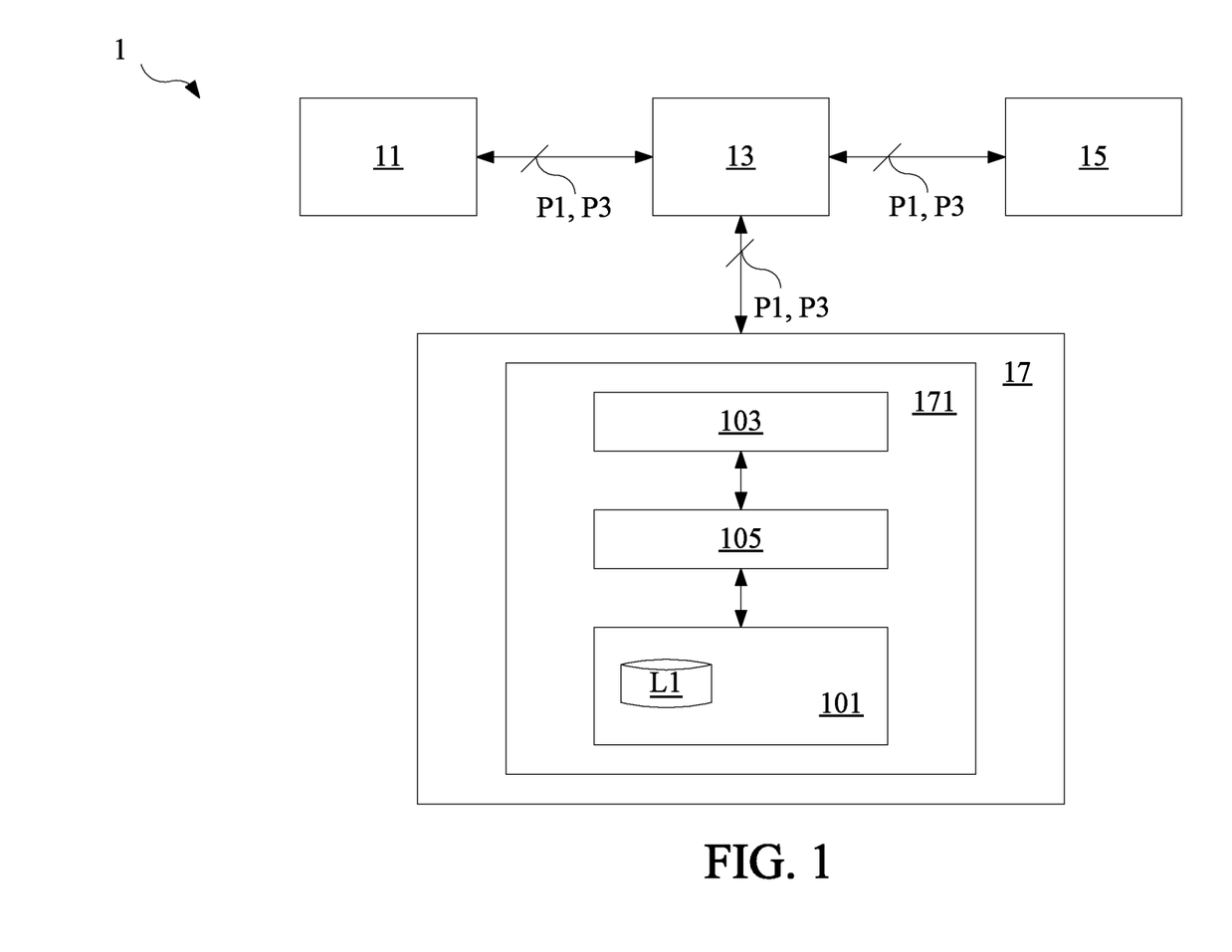
FIG. 1 illustrates an industrial control system in some embodiments of the present invention.

FIG. 1 illustrates an industrial control system (ICS) 1 in some embodiments of the present invention. Contents shown in FIG. 1 are only for purpose of illustrating embodiments of the present invention instead of limiting the present invention.

Referring to FIG. 1, the industrial control system 1 may comprise a master device 11 at a supervisory control layer, a slave device 15 at a control layer and a gateway 13 between the supervisory control layer and the control layer. The master device 11, the gateway 13 and the slave device 15 may form a communication network. In the communication network, the master device 11 may transmit a packet (e.g., an instruction) to the slave device 15 via the gateway 13, and the slave device 15 may also transmit a packet (e.g., data) to the master device 11 via the gateway 13. For example, in some embodiments, the industrial control system 1 may adopt a Modbus communication protocol to regulate the communication among the master device 11, the gateway 13 and the slave device 15. The master device 11 may comprise a human machine interface and/or a supervisory control and data acquisition system for remotely supervising and controlling all the operations of the whole industrial control system 1. The slave device 15 may comprise a programmable logic controller for controlling the operation of industrial equipments of the field layer and transmitting data of the industrial equipments to the supervisory control layer via the gateway 13.

The industrial control system 1 may further comprise an intrusion detection system 17. The intrusion detection system 17 may be configured to retrieve an instruction packet or a data packet being propagated between the master device 11 and the slave device 15, and determine whether the industrial control system 1 is subjected to attack or intrusion by analyzing the industrial control system 1. In some embodiments, the intrusion detection system 17 may be an independent device located outside the master device 11, the gateway 13 and the slave device 15, and connected with the gateway 13, as shown in FIG. 1. In some embodiments, the intrusion detection system 17 may also be located within any of the master device 11, the gateway 13 and the slave device 15.

In some embodiments, as shown in FIG. 1, a system 171 for identifying application layer behavior may be located within the intrusion detection system 17 and may comprise a storage 101, a transmitter 103 and a processor 105. In some embodiments, in addition to the storage 101, the transmitter 103 and the processor 105, the system 171 for identifying application layer behavior may further comprise other elements which are for example but not limited to an input element, an output element or the like. All elements comprised in the system 171 for identifying application layer behavior are electrically connected together, and the connection between every two of the elements may be direct electrical connection (i.e., connection not via other elements) or indirect electrical connection (i.e., connection via other elements). For example, as shown in FIG. 1, the processor 105 may be electrically connected to the storage 101 and the transmitter 103 directly. In some embodiments, the system 171 for identifying application layer behavior may also be an independent device provided outside the intrusion detection system 17.

The storage 101 may comprise a primary memory (which is also called a main memory or an internal memory), and the processor 105 may directly read instruction sets stored in the primary memory and execute these instruction sets if needed. The storage 101 may further comprise a secondary memory (which is also called an external memory or an auxiliary memory), and the secondary memory may transmit data stored to the primary memory via a data buffer. For example, the secondary memory may be but not limited to a hard disk, an optical disk or the like. The storage 101 may further comprise a third-level memory, i.e., a storage device that can be inserted into or pulled out from a computer directly, e.g., a mobile disk.

Depending on different requirements, the transmitter 103 may have different architectures. For example, in the case where the system 171 for identifying application layer behavior is provided within the intrusion detection system 17, the transmitter 103 may comprise a transmission element (e.g., a wire) for transmitting signals within the intrusion detection system 17 so as to transmit to the system 171 for identifying application layer behavior an instruction packet or a data packet retrieved by the intrusion detection system 17 from any of the intrusion detection system 17, the master device 11, the gateway 13 and the slave device 15. As another example, in the case where the system 171 for identifying application layer behavior is an independent device provided outside the intrusion detection system 17, the transmitter 103 may comprise various communication elements (e.g., a wireless communication transceiver or a wired communication transceiver) for retrieving an instruction packet or a data packet being propagated between the master device 11 and the slave device 15 from any of the intrusion detection system 17, the master device 11, the gateway 13 and the slave device 15.

The processor 105 may comprise a microprocessor or a microcontroller for executing various operations required by the system 171 for identifying application layer behavior. The microprocessor or the microcontroller is a programmable specific integrated circuit that is capable of operating, storing, outputting/inputting or the like. Moreover, the microprocessor or the microcontroller can receive and process various coded instructions, thereby performing various logical operations and arithmetical operations and outputting corresponding operation results.

The storage 101 may be configured to store a normal behavior status list L1. The transmitter 103 may be configured to transmit to the system 171 for identifying application layer behavior a current packet P1 (an instruction packet or a data packet) which is propagated between the master device 11 and the slave device 15. The processor 105 may be configured to determine a current status of the application layer behavior of the industrial control system 1 by analyzing the current packet P1 and identify whether the current status of the application layer behavior is normal according to the normal behavior status list L1, thereby determining whether the industrial control system 1 is subjected to the attack or intrusion from the third party.

Figure 2:
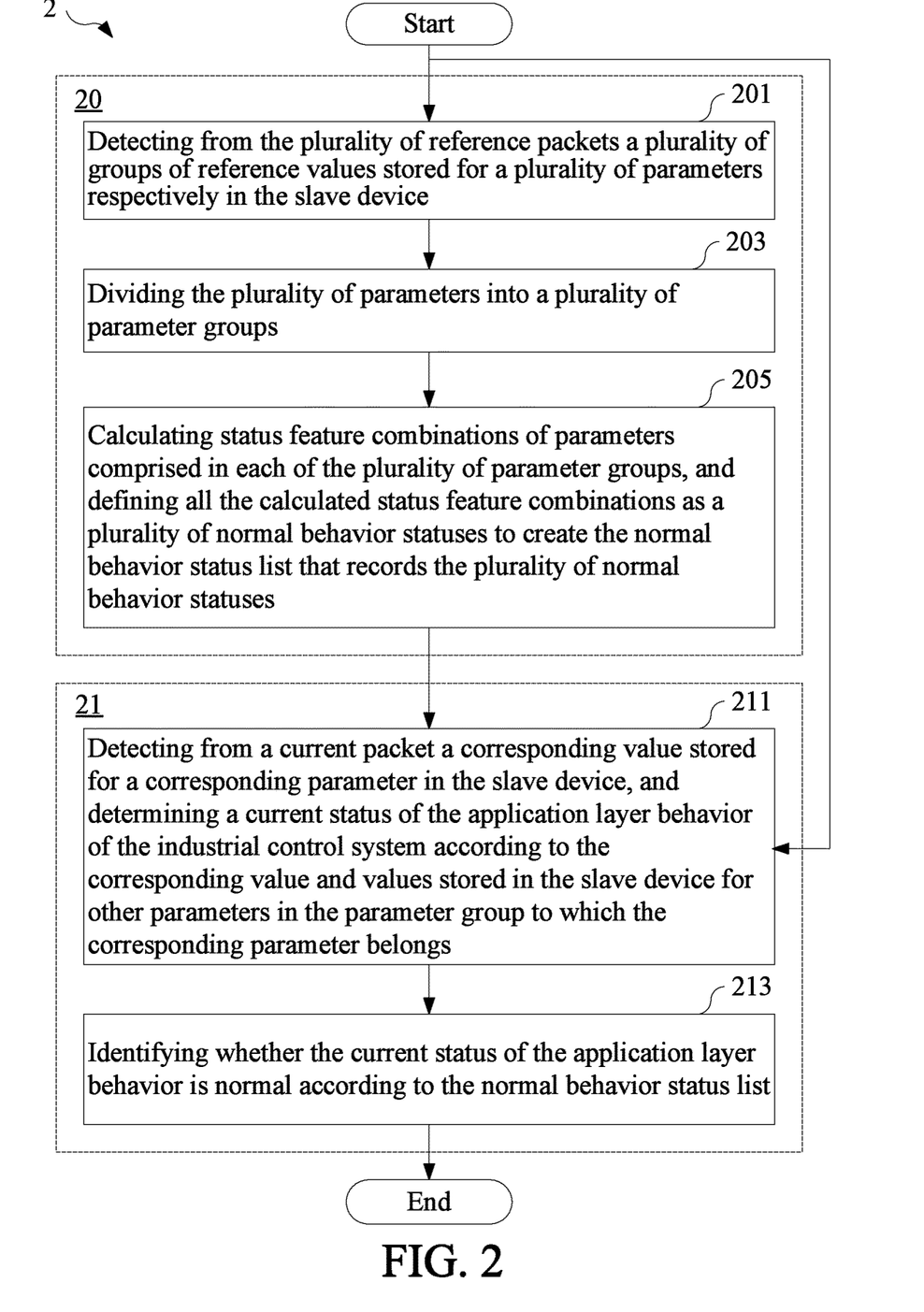
FIG. 2 illustrates an operation process of a system for identifying application layer behavior shown in FIG. 1, in some embodiments of the present invention.

FIG. 2 illustrates an operation process 2 of the system 171 for identifying application layer behavior shown in FIG. 1, in some embodiments of the present invention. Contents shown in FIG. 2 are only for purpose of illustrating embodiments of the present invention instead of limiting the present invention.

Referring to FIG. 2, the operation process 2 may comprise a training process 20 and a detecting process 21. In the training process 20, the system 171 for identifying application layer behavior may perform the following processing: the transmitter 103 transmits to the system 171 for identifying application layer behavior a plurality of reference packets P3 propagated between the master device 11 and the slave device 15 within a reference time interval, and the processor 105 detects from the plurality of reference packets P3 a plurality of groups of reference values stored for a plurality of parameters respectively in a plurality of memory addresses of the slave device 15 within the reference time interval (labeled as 201); and the processor 105 calculates a plurality of groups of correlation features of the plurality of groups of reference values respectively, calculates correlations between the plurality of parameters by analyzing the plurality of groups of correlation features, and divides the plurality of parameters into a plurality of parameter groups according to the correlations between the plurality of parameters (labeled as 203); and the processor 105 calculates status feature combinations of parameters comprised in each of the plurality of parameter groups, and define all the calculated status feature combinations as a plurality of normal behavior statuses to create a normal behavior status list L1 that records the plurality of normal behavior statuses (labeled as 205).

In the detecting processor 21, the system 171 for identifying application layer behavior may perform the following processing: the processor 105 detects from the current packet P1 a corresponding value stored for a corresponding parameter in a corresponding memory address among the plurality of memory addresses of the slave device 15, and determines a current status of the application layer behavior of the industrial control system 1 according to the corresponding value and values stored in the slave device 15 for other parameters in the parameter group to which the corresponding parameter belongs (labeled as 211); and the processor 105 identifies whether the current status of the application layer behavior is normal according to the normal behavior status list L1 stored in the storage 101 (labeled as 213). In detail, the processor 105 may compare the current status of the application layer behavior with all the normal behavior statuses comprised in the normal behavior status list L1. If the current status is the same as or similar to any of the normal behavior statuses comprised in the normal behavior status list L1, then the processor 105 identifies the application layer behavior as normal and determines that the industrial control system 1 is not subjected to attack or intrusion and then detects next current packet P1. However, if the current status is not the same as similar to any of the normal behavior statuses comprised in the normal behavior status list L1, then the processor 105 identifies the application layer behavior as abnormal and determines that the industrial control system 1 has been subjected to attack or intrusion.

In some embodiments, when it is determined that the industrial control system 1 is subjected to the attack or intrusion, the system 171 for identifying application layer behavior may notify a user of the system 171 for identifying application layer behavior and/or the intrusion detection system 17 by images or sounds through various output elements (e.g., a display, a loudspeaker or the like). In some embodiments, the system 171 for identifying application layer behavior may also transmit various data generated in the training process 20 and/or the detecting process 21 to a security information event management (SIEM) platform located outside the intrusion detection system 17 for use.

In some embodiments, the normal behavior status list L1 may be calculated by other independent computer devices outside the system 171 for identifying application layer behavior instead of the processor 105. Therefore, in these embodiments, the system 171 for identifying application layer behavior may not execute the training process 20 shown in FIG. 2.

Figure 3:
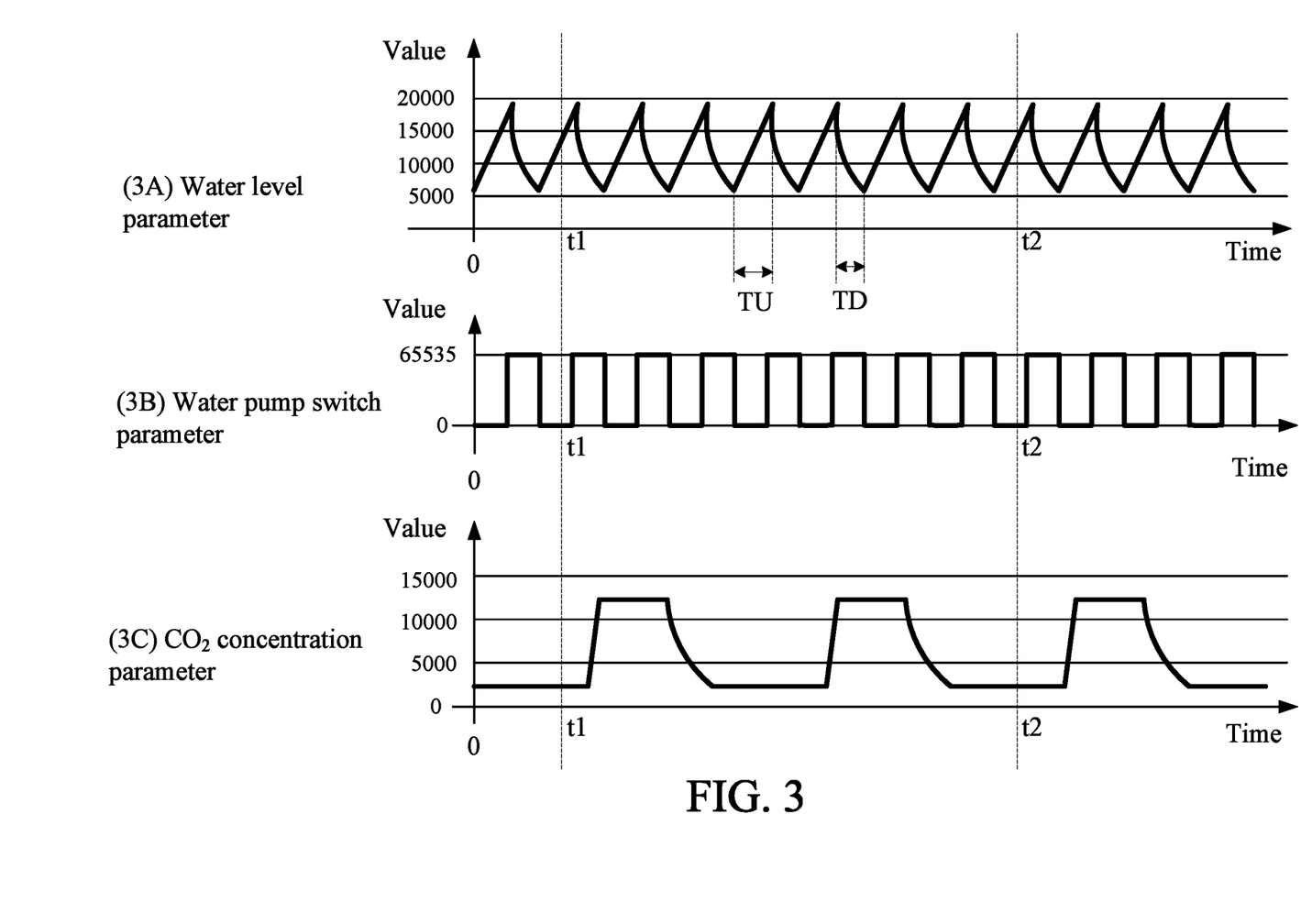
FIG. 3 illustrates a time sequence diagram of values stored for a plurality of parameters in the slave device shown in FIG. 1, in some embodiments of the present invention.

FIG. 3 illustrates a time sequence diagram of values stored for a plurality of parameters in the slave device 15 shown in FIG. 1, in some embodiments of the present invention. Contents shown in FIG. 3 are only for purpose of illustrating embodiments of the present invention instead of limiting the present invention. The operation process 2 shown in FIG. 2 will be further illustrated in combination with contents shown in FIG. 3.

Referring to FIG. 2 to FIG. 3, in the training process 20, the processor 105 may detect from the plurality of reference packets P3 a plurality of groups of reference values stored for a water level parameter 3A, a water pump switch parameter 3B and a $CO_2$ concentration parameter 3C respectively in three memory addresses of three sensors comprised in the slave device 15 within a reference time interval (i.e., a time interval from a time point t1 to a time point t2, which is for example but not limited to: 30 minutes, 1 hour, 12 hours, 1 day, 1 month or 4 months). For example, the processor 105 may detect from the plurality of reference packets P3 a plurality of reference values stored for the water level parameter 3A, the water pump switch parameter 3B and the $CO_2$ concentration parameter 3C respectively in the slave device 15 within one hour every other second.

Next, the processor 105 may calculate a group of correlation features for a group of reference values of each of the water level parameter 3A, the water pump switch parameter 3B and the $CO_2$ concentration parameter 3C. For example, each group of correlation features may comprise at least one of the following correlation features: the number of slope conversions (including converting into a negative value from a positive value and converting into a positive value from a negative value), an average of ascending time intervals TU, a standard deviation of the ascending time intervals TU, an average of descending time intervals TD, a standard deviation of the descending time intervals TD or the like. After the three groups of correlation features are calculated, the processor 105 may calculate the correlations between the water level parameter 3A, the water pump switch parameter 3B and the $CO_2$ concentration parameter 3C by analyzing the three groups of correlation features.

In some embodiments, the processor 105 may analyze the three groups of correlation features through machine learning processing, thereby calculating the correlations between the three parameters. The machine learning processing may be but not limited to a Support Vector Machine (SVM) algorithm, a Decision Tree algorithm, or a Depth Learning algorithm or the like.

In some embodiments, the processor 105 may analyze the three groups of correlation features through feature comparison processing, thereby calculating the correlations between the three parameters. For example, the processor 105 may calculate the correlations between the three parameters according to the following equation:

$$\Delta E_{mn} = (N_m - N_n) + (\Delta TU_m - TU_n) + (\sigma TU_m - \sigma U_n) + (\Delta TD_m - TD_n) + (\sigma TD_m - \sigma D_n) \quad (1)$$

wherein:

$\Delta E_{mn}$ is the correlation between the $m^{th}$ parameter and the $n^{th}$ parameter;

$E_m$ and $E_n$ are the numbers of slope conversions of the $m^{th}$ parameter and the $n^{th}$ parameter respectively;

$\Delta TU_m$ and $\Delta TU_n$ are averages of ascending time intervals TU of the $m^{th}$ parameter and the $n^{th}$ parameter respectively;

$\sigma TU_m$ and $\sigma TU_n$ are standard deviations of the ascending time intervals TU of the $m^{th}$ parameter and the $n^{th}$ parameter respectively;

$\Delta TD_m$ and $\Delta TD_n$ are averages of descending time intervals TD of the $m^{th}$ parameter and the $n^{th}$ parameter respectively; and $\sigma TD_m$ and $\sigma TD_n$ are standard deviations of the descending time intervals TD of the $m^{th}$ parameter and the $n^{th}$ parameter respectively.

More particularly, after the three groups of correlation features of the three parameters, i.e., the water level parameter 3A, the water pump switch parameter 3B and the $CO_2$ concentration parameter 3C are calculated, the processor 105 may calculate the correlation between each parameter and each of the other two parameters according to the equation (1). If the correlation calculated for any two parameters is greater than a preset threshold, then the processor 105 classifies the two parameters into a same parameter group. Taking FIG. 3 as an example, because the correlation between the water level parameter 3A and the water pump switch parameter 3B is higher than a preset threshold, the processor 105 classifies the water level parameter 3A and the water pump switch parameter 3B into a same parameter group. Because the correlations between the $CO_2$ concentration parameter 3C and each of the water level parameter 3A and the water pump switch parameter 3B are all below the preset threshold, the processor 105 classifies the $CO_2$ concentration parameter 3C into another parameter group.

After classifying the water level parameter 3A and the water pump switch parameter 3B into a same parameter group, the processor 105 may calculate status features of the water level parameter 3A and the water pump switch parameter 3B respectively at each time point within the reference time interval, thereby forming a plurality of status feature combinations. Similarly, after classifying the $CO_2$ concentration parameter 3C into another parameter group, the processor 105 may calculate a status feature of the $CO_2$ concentration parameter 3C at each time point within the reference time interval, thereby forming a plurality of status feature combinations. The aforesaid status features may comprise at least one of a value dispersion degree feature, a value tendency feature, a value potential tendency feature or other status features that can be used to identify parameter statuses.

For example, the processor 105 may calculate a value dispersion degree feature $V_{level}$ of the water level parameter 3A (and other parameters whose values vary continuously) at any time point within the reference time interval according to the following equation:

$$V_{level} = \left[ \frac{V - V_{min}}{V_{max} - V_{min}} \times N \right] + 1; \; 1 \leq V_{level} \leq N \quad (2)$$

wherein V is a reference value of the water level parameter 3A at any time point within the reference time interval, $V_{min}$ and $V_{max}$ are respectively a minimum reference value and a maximum reference value of the water level parameter 3A within the reference time interval, and N is a preset value dispersion level.

For example, the processor 105 may calculate a value tendency $\Delta V$ of the water level parameter 3A (and other parameters whose values vary continuously) at any time point within the reference time interval according to the following equation:

$$\Delta V = V_n - V_{n-1} \quad (3)$$

wherein $V_n$ is a reference value of the water level parameter 3A at the $n^{th}$ time point, and $V_{n-1}$ is a reference value of the water level parameter 3A at the $(n-1)^{th}$ time point (i.e., a time point immediately before the $n^{th}$ time point).

Then, the processor 15 may determine a value tendency feature D of the water level parameter 3A (and other parameters whose values vary continuously) at any time point within the reference time interval according to the following condition:

$$\begin{cases} D = 1; \text{ if } \Delta V > 0 \\ D = 0; \text{ if } \Delta V = 0 \\ D = -1; \text{ if } \Delta V < 0 \end{cases}$$

For example, the processor 105 may determine a value potential tendency $\Delta A$ of the water level parameter 3A (and other parameters whose values vary continuously) at any time point within the reference time interval according to the following equation:

$$\Delta A = \frac{\frac{V_n - V_{n-1}}{\Delta t} - \frac{V_{n-1} - V_{n-2}}{\Delta t}}{\Delta t} \quad (4)$$

wherein $V_n$ is a reference value of the water level parameter 3A at the $n^{th}$ time point, $V_{n-1}$ is a reference value of the water level parameter 3A at the $(n-1)^{th}$ time point (i.e., a time point immediately before the $n^{th}$ time point), $V_{n-2}$ is a reference value of the water level parameter 3A at the $(n-2)^{th}$ time point (i.e., a time point immediately before the $(n-1)^{th}$ time point), and $\Delta t$ is a distance between two adjacent time points.

Thereafter, the processor 105 may determine a value potential tendency feature F of the water level parameter 3A (and other parameters whose values vary continuously) at any time point within the reference time interval according to the following condition:

$$\begin{cases} F = 1; \text{ if } \Delta V > 0 \\ F = 0; \text{ if } \Delta V = 0 \\ F = -1; \text{ if } \Delta V < 0 \end{cases}$$

For example, the processor 105 may determine a value dispersion degree feature $V_{level}$ of the water pump switch parameter 3B (and other parameters whose values vary logically (i.e., values being either null or not null) at any time point within the reference time interval according to the following condition:

$$\begin{cases} V_{level} = 1; \text{ if } V > 0 \\ V_{level} = 0; \text{ if } V = 0 \end{cases}$$

wherein V is a reference value of the water pump switch parameter 3B at any time point within the reference time interval.

For example, the processor 105 may determine a value tendency feature D of the water pump switch parameter 3B (and other parameters whose values vary logically (i.e., values being either null or not null) at any time point within the reference time interval according to the following condition:

$$\begin{cases} D = 1; \text{ if } \Delta V \neq 0 \\ D = 0; \text{ if } \Delta V = 0 \end{cases}$$

wherein $\Delta V$ is the value tendency of the water pump switch parameter 3B at any time point within the reference time interval (referring to the equation (3)).

After calculating the status features of the water level parameter 3A and the water pump switch parameter 3B in the same parameter group respectively at each time point within the reference time interval, the processor 105 may combine the status features of the water level parameter 3A and the water pump switch parameter 3B at each time point into a status feature combination, and define each status feature combination as a normal behavior status. In some embodiments, because the status feature combinations at some time points may be the same as or similar to each other, the processor 105 may first select one status feature combination from the same or similar status feature combinations and then define each of the selected status feature combinations as a normal behavior status. Similarly, after calculating the status feature of the $CO_2$ concentration parameter 3C in another parameter group at each time point within the reference time interval, the processor 105 may define the status feature of the $CO_2$ concentration parameter 3C at each time point as a normal behavior status if the another parameter group only includes the $CO_2$ concentration parameter 3C. In some embodiments, because the status features at some time points may be the same as or similar to each other, the processor 105 may first select one status feature from the same or similar status features and then define each of the selected status features as a normal behavior status.

After defining all the status feature combinations, the processor 105 may create the normal behavior status list L1 that records the plurality of normal behavior statuses according to the plurality of normal behavior statuses, and store the normal behavior status list L1 into the storage 101, and then the training process 20 is ended.

Referring to FIG. 2 to FIG. 3, in the detecting processor 21, the processor 105 detects from a current packet P1 detected at any time point a corresponding value stored for one of the water level parameter 3A, the water pump switch parameter 3B and the $CO_2$ concentration parameter 3C (which is called a corresponding parameter hereinafter) in the slave device 15, and determines the current status of the application layer behavior of the industrial control system 1 according to the corresponding value and values stored in the slave device 15 for other parameters in the parameter group to which the corresponding parameter belongs.

For example, if the corresponding parameter detected from the current packet P1 by the processor 105 is the water level parameter 3A (or the water pump switch parameter 3B), then the processor 105 first calculates the status feature of the corresponding parameter (e.g., at least one of the aforesaid value dispersion degree feature, value tendency feature and value potential tendency feature) and calculates the status feature (e.g., at least one of the aforesaid value dispersion degree feature, value tendency feature and value potential tendency feature) of the current value stored in the slave device 15 for the water pump switch parameter 3B (or the water level parameter 3A) in the same parameter group. Then, the processor 105 may determine the calculated status feature as the current status of the application layer behavior of the industrial control system 1. Finally, the processor 105 may compare the current status with each of the normal behavior statuses (i.e., each of the status feature combinations) in the normal behavior status list L1 that are recorded for the parameter group to which the corresponding parameter belongs.

As another example, if the corresponding parameter detected from the current packet P1 by the processor 105 is the $CO_2$ concentration parameter 3C, then the processor 105 calculates the status feature of the value of the corresponding parameter (e.g., at least one of the aforesaid value dispersion degree feature, value tendency feature and value potential tendency feature). Then, the processor 105 may determine the calculated status feature as the current status of the application layer behavior of the industrial control system 1. Finally, the processor 105 may compare the current status with each of the normal behavior statuses (i.e., each of the status features) in the normal behavior status list L1 that are recorded for the parameter group to which the corresponding parameter belongs.

Figure 4:
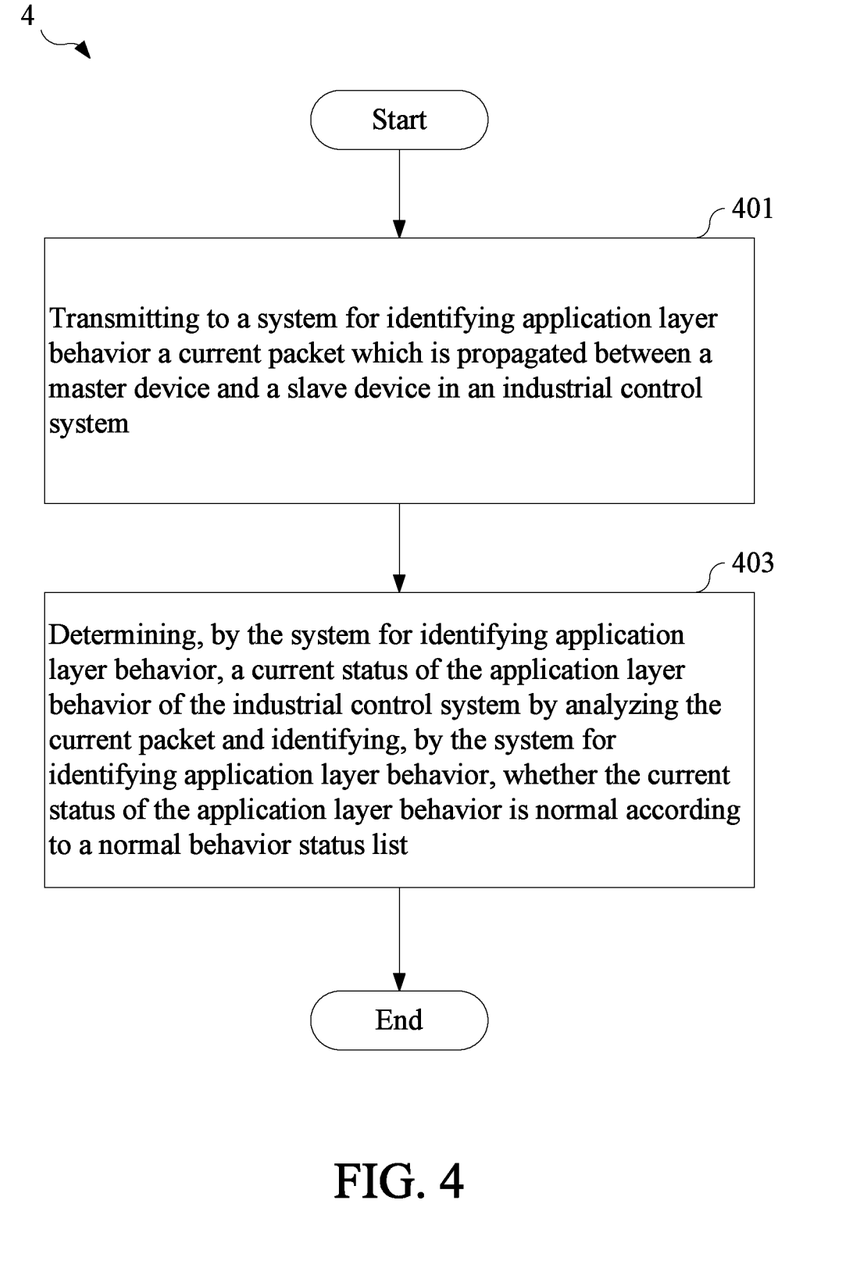
FIG. 4 illustrates a method for identifying application layer behavior in some embodiments of the present invention.

FIG. 4 illustrates a method 4 for identifying application layer behavior in some embodiments of the present invention. Contents shown in FIG. 4 are only for purpose of illustrating embodiments of the present invention instead of limiting the present invention.

Referring to FIG. 4, the method 4 for identifying application layer behavior may comprise the following steps:

transmitting to a system for identifying application layer behavior a current packet which is propagated between a master device and a slave device in an industrial control system (labeled as 401); and determining, by the system for identifying application layer behavior, a current status of the application layer behavior of the industrial control system by analyzing the current packet and identifying, by the system for identifying application layer behavior, whether the current status of the application layer behavior is normal according to a normal behavior status list (labeled as 403).

In some embodiments, in addition to the steps 401 and 403, the method 4 for identifying application layer behavior may further comprise the following steps: transmitting to the system for identifying application layer behavior a plurality of reference packets propagated between the master device and the slave device within a reference time interval; detecting, by the system for identifying application layer behavior, from the plurality of reference packets a plurality of groups of reference values stored for a plurality of parameters respectively in a plurality of memory addresses of the slave device within the reference time interval; calculating, by the system for identifying application layer behavior, a plurality of groups of correlation features of the plurality of groups of reference values respectively, calculating, by the system for identifying application layer behavior, correlations between the plurality of parameters by analyzing the plurality of groups of correlation features, and dividing, by the system for identifying application layer behavior, the plurality of parameters into a plurality of parameter groups according to the correlations between the plurality of parameters; calculating, by the system for identifying application layer behavior, status feature combinations of parameters comprised in each of the plurality of parameter groups, and defining, by the system for identifying application layer behavior, all the calculated status feature combinations as a plurality of normal behavior statuses to create the normal behavior status list that records the plurality of normal behavior statuses; and detecting, by the system for identifying application layer behavior, from the current packet a corresponding value stored for a corresponding parameter in a corresponding memory address among the plurality of memory addresses of the slave device, and determining, by the system for identifying application layer behavior, the current status of the application layer behavior of the industrial control system according to the corresponding value and values stored in the slave device for other parameters in the parameter group to which the corresponding parameter belongs. In these embodiments, the system for identifying application layer behavior may analyze the plurality of groups of correlation features through feature comparison processing or machine learning processing. In these embodiments, each of the status feature combinations is related to at least one of a value dispersion degree, a value tendency and a value potential tendency.

In some embodiments, for the method 4 for identifying application layer behavior, the industrial control system may adopt a Modbus communication protocol.

In some embodiments, all of the aforesaid steps in the method 4 for identifying application layer behavior may be executed by the system 171 for identifying application layer behavior. In some embodiments, in addition to the aforesaid steps, the method 4 for identifying application layer behavior may further comprise other steps corresponding to all the embodiments of the system 171 for identifying application layer behavior described above. These other steps of the method 4 for identifying application layer behavior shall be appreciated by a person having ordinary skill in the art based on the above description of the system 171 for identifying application layer behavior, and thus will not be further described herein.

The above disclosure is related to the detailed technical contents and inventive features thereof. A person having ordinary skill in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A system for identifying application layer behavior, comprising:
   a storage, being configured to store a normal behavior status list;
   a transmitter, being configured to intercept a current packet which is propagated between a master device and a slave device in an industrial control system and send information of the current packet for analysis; and
   a processor electrically connected with the storage and the transmitter, being configured to determine a current status of the application layer behavior of the industrial control system by analyzing application layer data of the current packet and identify whether the current status of the application layer behavior is normal according to the normal behavior status list;
   wherein the processor detects from the current packet a corresponding value stored for a corresponding parameter in a corresponding memory address among a plurality of memory addresses of the slave device, and determines the current status of the application layer behavior of the industrial control system according to the corresponding value and values stored in the slave device for other parameters in the parameter group to which the corresponding parameter belongs.

2. The system for identifying the application layer behavior of claim 1, wherein:
   the transmitter is further configured to intercept a plurality of reference packets propagated between the master device and the slave device within a reference time interval and send information of the plurality of reference packets for analysis; and
   the processor is further configured to:
   detect from the plurality of reference packets a plurality of groups of reference values stored for a plurality of parameters respectively in the plurality of memory addresses of the slave device within the reference time interval;
   calculate a plurality of groups of correlation features of the plurality of groups of reference values respectively, calculate correlations between the plurality of parameters by analyzing the plurality of groups of correlation features, and divide the plurality of parameters into a plurality of parameter groups according to the correlations between the plurality of parameters; and
   calculate status feature combinations of parameters comprised in each of the plurality of parameter groups, and define all the calculated status feature combinations as a plurality of normal behavior statuses to create the normal behavior status list that records the plurality of normal behavior statuses.

3. The system for identifying the application layer behavior of claim 2, wherein the processor analyzes the plurality of groups of correlation features through feature comparison processing.

4. The system for identifying the application layer behavior of claim 2, wherein the processor analyzes the plurality of groups of correlation features through machine learning processing.

5. The system for identifying the application layer behavior of claim 2, wherein each of the status feature combinations is related to at least one of a value dispersion degree, a value tendency and a value potential tendency.

6. The system for identifying the application layer behavior of claim 1, wherein the industrial control system adopts a Modbus communication protocol.

7. A method for identifying application layer behavior, comprising the following steps:
- intercepting a current packet which is propagated between a master device and a slave device in an industrial control system and sending information of the current packet for analysis; and
- determining, by the system for identifying the application layer behavior, a current status of the application layer behavior of the industrial control system by analyzing application layer data of the current packet and identifying, by the system for identifying the application layer behavior, whether the current status of the application layer behavior is normal according to a normal behavior status list;
- wherein the system for identifying the application layer behavior detects from the current packet a corresponding value stored for a corresponding parameter in a corresponding memory address among a plurality of memory addresses of the slave device, and determines the current status of the application layer behavior of the industrial control system according to the corresponding value and values stored in the slave device for other parameters in the parameter group to which the corresponding parameter belongs.

8. The method for identifying the application layer behavior of claim 7, further comprising:
- intercepting a plurality of reference packets propagated between the master device and the slave device within a reference time interval and sending information of the plurality of reference packets for analysis;
- detecting, by the system for identifying the application layer behavior, from the plurality of reference packets a plurality of groups of reference values stored for a plurality of parameters respectively in the plurality of memory addresses of the slave device within the reference time interval;
- calculating, by the system for identifying the application layer behavior, a plurality of groups of correlation features of the plurality of groups of reference values respectively, calculating, by the system for identifying the application layer behavior, correlations between the plurality of parameters by analyzing the plurality of groups of correlation features, and dividing, by the system for identifying the application layer behavior, the plurality of parameters into a plurality of parameter groups according to the correlations between the plurality of parameters; and
- calculating, by the system for identifying the application layer behavior, status feature combinations of parameters comprised in each of the plurality of parameter groups, and defining, by the system for identifying the application layer behavior, all the calculated status feature combinations as a plurality of normal behavior statuses to create the normal behavior status list that records the plurality of normal behavior statuses.

9. The method for identifying the application layer behavior of claim 8, wherein the system for identifying the application layer behavior analyzes the plurality of groups of correlation features through feature comparison processing.

10. The method for identifying the application layer behavior of claim 8, wherein the system for identifying the application layer behavior analyzes the plurality of groups of correlation features through machine learning processing.

11. The method for identifying the application layer behavior of claim 8, wherein each of the status feature combinations is related to at least one of a value dispersion degree, a value tendency and a value potential tendency.

12. The method for identifying the application layer behavior of claim 7, wherein the industrial control system adopts a Modbus communication protocol.

* * * * *